United States Patent Office 2,939,866
Patented June 7, 1960

2,939,866

17-SUBSTITUTEDCYCLOHEX[2,3] ANDROSTA-23(3), 4-DIEN-22-ONES AND DERIVATIVES

Norman W. Atwater, Des Plaines, Ill., assignor to G. D. Searle & Co., Chicago, Ill., a corporation of Delaware No Drawing. Filed Dec. 11, 1958, Ser. No. 779,556

15 Claims. (Cl. 260—239.55)

The compounds of the present invention may be represented by the structural formulae

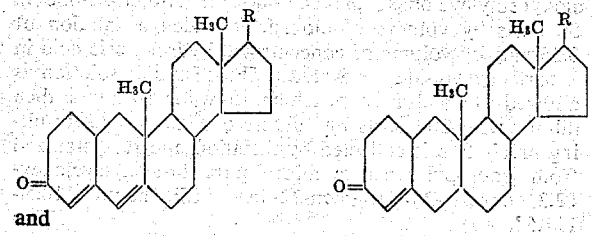

and

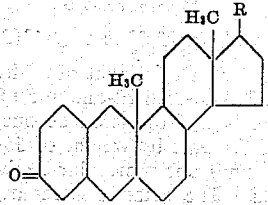

wherein R is selected from the group consisting of hydroxy, lower-alkanoyloxy, acetyl, and (α-ethylenedioxy)-ethyl radicals. Lower-alkanoyloxy radicals which R may represent are the acyl radicals of carboxylic acids such as formoxy, acetoxy, propionyloxy, butyryloxy, valeryloxy, caproyloxy, heptylyloxy, caprylyloxy, and branched-chained isomers of the foregoing.

The compounds of this invention are novel in that they contain an additional six-membered ring which has been attached to ring A of the cyclopentanophenanthrene structure characteristic of the steroid molecule. This results in a pentacyclic structure, the parent hydrocarbon of which would be named cyclohex[2,3]androstane. Thus the present invention relates to 17-substituted-cyclohex-[2,3]androsta-23(3),4-dien-22-ones, 17-substituted-cyclohex[2,3]androst-23(3)-en-22-ones, and 17-substituted-cyclohex[2,3]androstan-22-ones.

Suitable starting materials for the synthesis of the compounds of this invention are, for example, testosterone and progesterone 20-ethylene ketal.

The synthesis involves three steps, the first of which consists of treating one of the aforementioned starting materials with ethyl formate in the presence of a condensing agent and isolating the product to yield the 2-hydroxymethylene derivative as the sodium salt. The latter is treated with β-diethylaminobutanone methiodide in the presence of a suitable condensing agent and isolation of the product affords the 2-(3-oxobutyl)compound. The final step, which is cyclization of the 2-(3-oxobutyl) derivative, consists of treating the latter with an aqueous solution of potassium hydroxide in methanol and isolating the product to afford the cyclohex[2,3]androsta-23(3),4-dien-22-ones of the present invention substituted in the 17-position with a hydroxy or (α-ethylenedioxy)ethyl radical. As a specific example of this three-step process, progesterone 20-ethylene ketal is treated with ethyl formate in the presence of sodium hydride and the product isolated to afford the sodium salt of 2-hydroxymethylene-progesterone 20-ethylene ketal. The latter is treated with β-diethylaminobutanone methiodide in the presence of sodium methoxide and the product isolated to afford 2-(3-oxobutyl)-progesterone 20-ethylene ketal. By treating the latter compound with an aqueous solution of potassium hydroxide in methanol and isolating the product, 17-(α - ethylenedioxy)ethylcyclohex[2,3]androsta - 23(3),4-dien-22-one is obtained.

Treating 17 - (α-ethylenedioxy)ethylcyclohex[2,3]androsta-23(3),4-dien-22-one with dilute hydrochloric acid and isolating the product yields 17-acetylcyclohex[2,3]-androsta-23(3),4-dien-22-one, a compound of the present invention.

Treating 17 - hydroxycyclohex[2,3]androsta - 23(3),4-dien-22-one with a lower alkanoic anhydride in the presence of pyridine and isolating the product affords the 17-(lower alkanoyloxy)cyclohex[2,3]androsta - 23(3),4-dien-22-ones of the present invention.

The 23(3)-dehydro-compounds of the present invention are prepared by treating the corresponding 23(3),4-dehydro-compounds with one molecular equivalent of hydrogen in the presence of a hydrogenation catalyst and isolating the product. As a specific example, 17-acetyl-cyclohex[2,3]androsta - 23(3),4 - dien - 22 - one is treated with one molecular equivalent of hydrogen in the presence of 5% palladium-on-carbon catalyst and the product isolated to afford 17-acetylcyclohex[2,3]androst-23-(3)-en-22-one.

The perhydro-compounds of the present invention are prepared by treating the corresponding 23(3),4-dehydro-compounds with two molecular equivalents of hydrogen in the presence of a hydrogenation catalyst and isolating the product. For example, 17-acetoxycyclohex[2,3]androsta-23(3),4-dien-22-one is treated with two molecular equivalents of hydrogen in the presence of 5% palladium-on-carbon catalyst and the product isolated to yield 17-acetoxycyclohex[2,3]androstan-22-one.

The compounds of the present invention have valuable pharmacological properties. They possess, for example, activity characteristic of cortisone; that is, they are able to inhibit the hyperemia associated with iritis, an inflammation of the eye. They have progestational activity also.

The invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples temperatures are given in degrees centigrade (0° C.). Quantities of materials are expressed in parts by weight and in parts by volume which bear the same relation one to the other as kilograms to liters.

EXAMPLE 1

*17-hydroxycyclohex[2,3]androsta-23(3),4-dien-22-one*

To a solution of 15 parts by weight of testosterone in 300 parts by volume of dry benzene is added 13.8 parts by weight of ethyl formate and 4.5 parts by weight of sodium hydride. The resultant slurry is stirred under nitrogen at room temperature for 30 hours, then treated with 15 parts by volume of methanol and 500 parts by volume of water. The layers are separated and the benzene solution washed once with water. The combined aqueous layers are acidified to pH 5 with 6 N HCl and the resultant precipitate extracted into ether. The ether solution is dried over anhydrous sodium sulfate, then evaporated to dryness. The residual oil on standing yields crystals which are recrystallized from ether to afford pure 2-hydroxymethylenetestosterone, M.P. about 168.5–171°.

To a solution of sodium methoxide prepared from 0.55 part by weight of sodium and 60 parts by volume of methanol is added first 7.35 parts by weight of the above-prepared 2-hydroxymethylenetestosterone then a solution of β-diethylaminobutanone methiodide, prepared from 6.62 parts by weight of β-diethylaminobutanone and 7.25 parts by weight of methyl iodide, in 40 parts by volume of anhydrous methanol. The resulting mixture is stirred under nitrogen at room temperature for 20 hours then acidified with glacial acetic acid and diluted with 1000 parts by volume of water. The resultant precipitate is extracted into ether, the ether solution washed with water, dried over anhydrous sodium sulfate and evaporated to dryness. This crude residue may be carried on to the next step satisfactorily or may be crystallized from acetone-water and acetone-petroleum ether to afford pure 2-(3-oxobutyl)testosterone, M.P. about 176.5–177°.

To a solution of crude 2-(3-oxobutyl)testosterone in 700 parts by volume of methanol is added a solution of 26 parts by weight of potassium hydroxide in 60 parts by volume of water. The reaction mixture is allowed to stand at room temperature for 2¾ hours then evaporated to a small volume in vacuo. Dilution with 500 parts by volume of water precipitates a solid which is extracted into ether. The ether solution is washed with water, dried over anhydrous sodium sulfate and evaporated to dryness in vacuo. Trituration with acetone produces the crude solid product which on recrystallization from acetone yields pure 17-hydroxycyclohex[2,3]androsta-23(3),4-dien-22-one, M.P. about 212–214°.

EXAMPLE 2

*17-acetoxycyclohex[2,3]androsta-23(3),4-dien-22-one*

To a solution of 2.2 parts by weight of 17-hydroxy-cyclohex[2,3]androsta-23(3),4-dien-22-one in 17 parts by volume of pyridine is added 8.5 parts by volume of acetic anhydride and the mixture allowed to stand at room temperature for 20 hours. Dilution with 200 parts by volume of water results in precipitation of a solid which is recrystallized from isopropyl ether to afford pure 17-acetoxycyclohex[2,3]androsta-23(3),4-dien-22-one, M.P. about 210–212°. A mixture of this acetate with the starting alcohol has a depressed melting point.

By substituting an equivalent quantity of isovaleric anhydride and otherwise proceeding according to the herein described processes 17-isovaleryloxycyclohex[2,3]androsta-23(3),4-dien-22-one is obtained.

EXAMPLE 3

*17 - (α - ethylenedioxy)ethylcyclohex[2,3]androsta - 23-(3),4-dien-22-one*

To a solution of 26.5 parts by weight of progesterone 20-ethylene ketal and 22 parts by volume of ethyl formate in 420 parts by volume of dry benzene is added 6.5 parts by weight of sodium hydride. The mixture is allowed to stand under nitrogen at room temperature for 45 hours with occasional swirling. The mixture is treated with 10 parts by volume of methanol and the solid removed by filtration and washed first with benzene then with ether. The crude salt is purified by washing with 250 parts by volume of water and drying by azeotropic distillation of the water from a slurry of the moist salt with 100 parts by volume of ethanol and 1500 parts by volume of benzene. When there is approximately 300 parts by volume of the slurry remaining, the salt is collected by filtration and dried in air.

To a solution of β-diethylaminobutanone methiodide, prepared from 4.1 parts by weight of β-diethlamino-butanone and 4.06 parts by weight of methyl iodide, in 50 parts by volume of anhydrous methanol is added 0.12 part by weight of sodium methoxide and a slurry of the salt as obtained in the previous paragraph with 100 parts by volume of methanol. The reaction mixture is stirred under nitrogen at room temperature for 16 hours. The solid product is collected by filtration and recrystallized from methanol and isopropyl ether to afford pure 2-(3-oxobutyl)progesterone 20-ethylene ketal, M.P. about 180.5–182.5°.

A slurry of 0.5 part of 2-(3-oxobutyl)progesterone 20-ethylene ketal with a solution of 1.75 parts by weight of potassium hydroxide in 5 parts by volume of water and 45 parts by volume of methanol is heated at reflux under nitrogen for 5 hours. The cooled mixture is filtered and the solid recrystallized from acetone and isopropyl ether to yield pure 17-(α-ethylenedioxy)ethylcyclohex[2,3]androsta-23(3),4-dien-22-one, M.P. about 251.5–253.5°.

EXAMPLE 4

*17-acetylcyclohex[2,3]androsta-23(3),4-dien-22-one*

To a solution of 1 part by weight of 17-(α-ethylene-dioxy(ethylcyclohex[2,3]androsta-23(3),4-dien-22-one in 50 parts by volume of dioxane is added a solution of 0.35 part by volume of concentrated hydrochloric acid in 7 parts by volume of water. The resulting solution is allowed to stand at room temperature for 16 hours, then diluted with 200 parts by volume of water. The resulting precipitate is collected by filtration and recrystallized from isopropyl ether to afford pure 17-acetylcyclohex[2,3]androsta-23(3),4-dien-22-one, M.P. about 110.5–111.5°.

EXAMPLE 5

*17-hydroxycyclohex[2,3]androst-23(3)-en-22-one*

A solution of 1 part by weight of 17-hydroxycyclohex-[2,3]androsta-23(3),4-dien-22-one in 50 parts by volume of ethyl acetate is hydrogenated at one atmosphere in the presence of 0.1 part by weight of 5% palladium-on-carbon catalyst until one molecular equivalent of hydrogen is absorbed. The catalyst is removed by filtration and the filtrate evaporated to dryness in vacuo. Recrystallization from ethyl acetate yields pure 17-hydroxycyclohex[2,3]androst-23(3)-en-22-one, M.P. about 191.5–193°.

EXAMPLE 6

*17-acetoxycyclohex[2,3]androst-23(3)-en-22-one*

To a solution of 2 parts by weight of 17-hydroxycyclo-hex[2,3]androst-23(3)-en-22-one in 15 parts by volume of pyridine is added 7.5 parts by volume of acetic anhydride and the mixture allowed to stand at room temperature for 20 hours. Dilution with 200 parts by volume of water precipitates a solid which is collected by filtration and recrystallized from ethanol and isopropyl ether to afford pure 17-acetoxycyclohex[2,3]androst-23-(3)-en-22-one, M.P. about 213.5–215°.

By substituting an equivalent quantity of butyric anhydride and otherwise proceeding according to the herein described processes, 17-butyroxycyclohex[2,3]androst-23-(3)-en-22-one is obtained.

EXAMPLE 7

*17-(α-ethylenedioxy)ethylcyclohex[2,3]androst - 23(3)-en-22-one*

To a solution of 2 parts by weight of 17-(α-ethylene-dioxy)ethylcyclohex[2,3]androsta-23(3),4-dien - 22 - one in 80 parts by volume of ethyl acetate is added 0.2 part by weight of 5% palladium-on-carbon catalyst and the mixture hydrogenated at one atmosphere until one molecular equivalent of hydrogen is absorbed. The mixture is filtered to remove the catalyst and the filtrate evaporated to dryness in vacuo. Recrystallization of the residue from isopropyl ether yields pure 17-(α-ethylene-dioxy(ethylcyclohex[2,3]androst - 23(3)-en-22-one. It exhibits maxima in the infrared at 6.00, 6.17, 9.37 and 9.50 microns.

EXAMPLE 8

17-acetylcyclohex[2,3]androst-23(3)-en-22-one

A solution of 1 part by weight of 17-acetylcyclohex-[2,3]androsta-23(3),4-dien-22-one in 100 parts by volume of ethyl acetate together with 0.15 part by weight of 5% palladium-on-carbon catalyst is shaken in a hydrogen atmosphere at one atmosphere pressure. The reaction is stopped when one molecular equivalent of hydrogen has been absorbed and the catalyst removed by filtration. Evaporation of the filtrate to dryness in vacuo and recrystallization of the residue from isopropyl ether affords pure 17-acetylcyclohex[2,3]androst-23(3)-en-22-one, M.P. 180–181°.

EXAMPLE 9

17-hydroxycyclohex[2,3]androstan-22-one

A solution of 1 part by weight of 17-hydroxycyclohex-[2,3]androsta-23(3),4-dien-22-one in 50 parts by volume of ethyl acetate is added to 0.1 part by weight of 5% palladium-on-carbon catalyst and the mixture hydrogenated at one atmosphere until two molecular equivalents of hydrogen are absorbed. The catalyst is removed by filtration and the filtrate evaporated to dryness in vacuo. Recrystallization of the residue from ethyl acetate affords pure 17-hydroxycyclohex[2,3]androstan-22-one. Its infrared absorption spectrum shows maxima at 2.90, 5.83 and 9.40 microns.

EXAMPLE 10

17-acetoxycyclohex[2,3]androstan-22-one

A solution of 1.04 parts by weight of 17-acetoxycyclohex[2,3]androsta-23(3),4-dien-22-one in 30 parts by volume of ethanol is hydrogenated at one atmosphere in the presence of 0.1 part by weight of 5% palladium-on-carbon catalyst until two molecular equivalents of hydrogen are absorbed. Removal of the catalyst by filtration and evaporation of the filtrate to dryness in vacuo leaves a residue from which pure 17-acetoxycyclohex[2,3]androstan-22-one, M.P. about 142.5–143.5°, is obtained by recrystallization from ethanol. Its infrared absorption spectrum shows maxima at 5.80 and 7.95 microns.

By substituting an equivalent quantity of 17-isovaleryloxycyclohex[2,3]androsta-23(3),4-dien-22-one and otherwise proceeding according to the herein described processes, 17-isovaleryloxycyclohex[2,3]androstan-22-one is obtained.

EXAMPLE 11

17-(α-ethylenedioxy)ethylcyclohex[2,3]androstan-22-one

To a solution of 2 parts by weight of 17-(α-ethylenedioxy)ethylcyclohex[2,3]androsta-23(3),4-dien-22-one in 80 parts by volume of ethyl acetate is added 0.2 part by weight of 5% palladium-on-carbon catalyst and the mixture hydrogenated at one atmosphere until two molecular equivalents of hydrogen are absorbed. The catalyst is removed by filtration and the filtrate evaporated to dryness in vacuo producing a residue which is recrystallized from isopropyl ether to afford pure 17-(α-ethylenedioxy)ethylcyclohex[2,3]androstan-22-one. Its infrared absorption spectrum possesses maxima at 5.84, 9.37 and 9.50 microns.

EXAMPLE 12

17-acetylcyclohex[2,3]androstan-22-one

A mixture of 1 part by weight of 17-acetylcyclohex-[2,3]androsta-23(3),4-dien-22-one dissolved in 100 parts by weight of ethyl acetate with 0.15 part by weight of 5% palladium-on-carbon catalyst is hydrogenated at one atmosphere until two molecular equivalents of hydrogen are absorbed. The catalyst is removed by filtration and the filtrate evaporated to dryness in vacuo leaving a residue which is recrystallized from isopropyl ether to yield pure 17-acetylcyclohex[2,3]androstan-22-one. It possesses maxima in the infrared at 2.90, 5.83 and 9.40 microns.

What is claimed is:

1. A compound of the structural formula

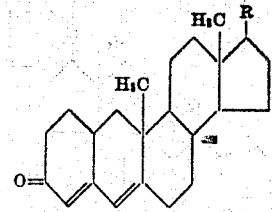

wherein R is selected from the group consisting of hydroxy, lower-alkanoyloxy, acetyl, and (α-ethylenedioxy)-ethyl radicals.

2. A compound of the structural formula

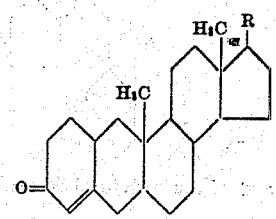

wherein R is selected from the group consisting of hydroxy, lower-alkanoyloxy, acetyl, and (α-ethylenedioxy)-ethyl radicals.

3. A compound of the structural formula

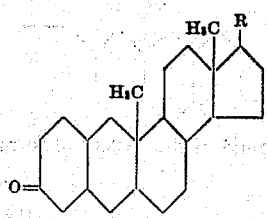

wherein R is selected from the group consisting of hydroxy, lower-alkanoyloxy, acetyl, and (α-ethylenedioxy)-ethyl radicals.

4. A compound of the structural formula

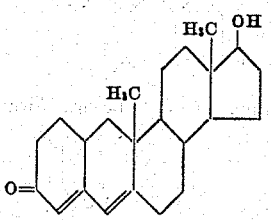

5. A compound of the structural formula

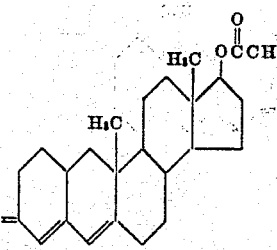

6. A compound of the structural formula

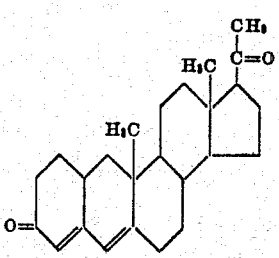

7. A compound of the structural formula
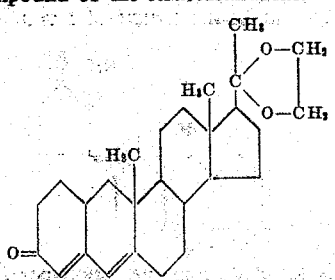
8. A compound of the structural formula
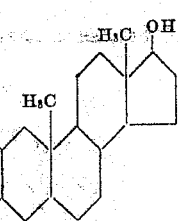
9. A compound of the structural formula
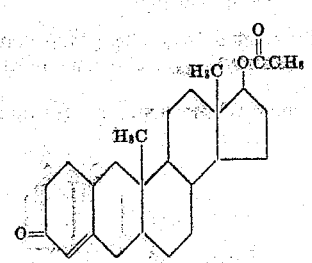
10. A compound of the structural formula
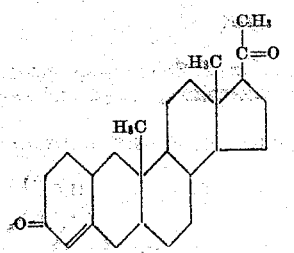
11. A compound of the structural formula
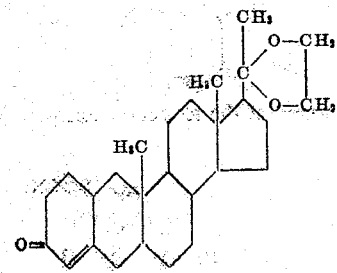
12. A compound of the structural formula
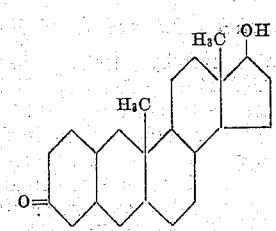
13. A compound of the structural formula
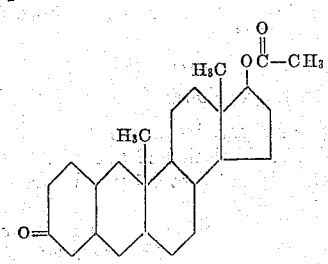
14. A compound of the structural formula
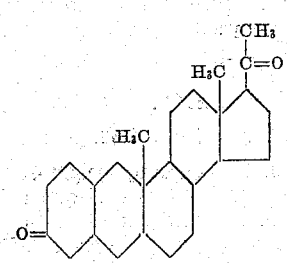
15. A compound of the structural formula
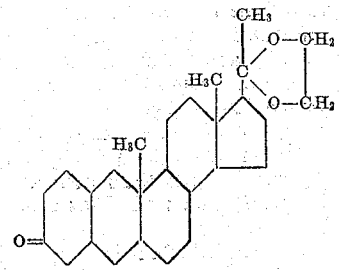
No references cited.